(12) United States Patent
Händle et al.

(10) Patent No.: US 9,890,777 B2
(45) Date of Patent: Feb. 13, 2018

(54) DELAY-MINIMIZED DETECTION OF AN AUXILIARY CONTROL VARIABLE

(71) Applicant: Moog GmbH, Böblingen (DE)

(72) Inventors: Werner Händle, Marbach am Neckar (DE); Eberhard Veil, Stuttgart (DE); Michael Bürker, Ammerbuch (DE)

(73) Assignee: Moog GmbH, Boblingen (DE)

( * ) Notice: Subject to any disclaimer, the term of this patent is extended or adjusted under 35 U.S.C. 154(b) by 851 days.

(21) Appl. No.: 14/256,364

(22) Filed: Apr. 18, 2014

(65) Prior Publication Data

US 2014/0322036 A1 Oct. 30, 2014

(30) Foreign Application Priority Data

Apr. 24, 2013 (EP) .................................... 13165039

(51) Int. Cl.
| | |
|---|---|
| *F04B 49/00* | (2006.01) |
| *G05B 11/42* | (2006.01) |
| *G05B 13/02* | (2006.01) |
| *F04B 43/12* | (2006.01) |

(52) U.S. Cl.
CPC .............. *F04B 49/00* (2013.01); *G05B 11/42* (2013.01)

(58) Field of Classification Search
CPC ................................ F04B 49/00; G05B 11/42
USPC .............................................. 700/38; 417/53
See application file for complete search history.

(56) References Cited

U.S. PATENT DOCUMENTS

| | | | | |
|---|---|---|---|---|
| 3,398,993 | A | * | 8/1968 | Sarbach ................ B60T 8/1766 303/152 |
| 7,006,909 | B1 | | 2/2006 | May |
| 2002/0128730 | A1 | * | 9/2002 | Shimada ................ G05B 13/04 700/29 |
| 2003/0097193 | A1 | | 5/2003 | Makino et al. |
| 2005/0149209 | A1 | * | 7/2005 | Wojsznis ................ G05B 11/32 700/30 |

(Continued)

FOREIGN PATENT DOCUMENTS

EP 2449436 B1 * 4/2013 ............. G05B 11/42

OTHER PUBLICATIONS

ProQuest Dialog Translation of Tautz et al., "Load Force Control for a Hydraulic Cylinder Unit With Load Observer", EP2449436B1, Originally Published as EP09164521 on May 9, 2012, Translated Feb. 6, 2017, 6pg.*

(Continued)

*Primary Examiner* — Ryan Coyer
(74) *Attorney, Agent, or Firm* — Harter Secrest & Emery LLP

(57) ABSTRACT

A method for the delay-minimized detection of an auxiliary control variable for a system comprising a control system and a controller, whereby an output variable is detected at the end of the control system, whereby a disturbance variable is active in the control system, characterized in that a state variable is detected in the control system at a place before the point of action of the disturbance variable, whereby the auxiliary control variable is calculated from the state variable that has been weighted with a constant $k_x$ and from an estimation error, whereby the estimation error is calculated from a comparison between the detected output variable and the integrated auxiliary control variable.

25 Claims, 2 Drawing Sheets

(56) References Cited

U.S. PATENT DOCUMENTS

| | | | |
|---|---|---|---|
| 2005/0216179 A1* | 9/2005 | Yasui | F01L 13/0021 |
| | | | 701/115 |
| 2007/0191967 A1* | 8/2007 | Yo | G05B 13/04 |
| | | | 700/1 |
| 2009/0198350 A1* | 8/2009 | Thiele | G05B 13/042 |
| | | | 700/30 |
| 2009/0251092 A1 | 10/2009 | Zhang et al. | |
| 2012/0112524 A1* | 5/2012 | Shibata | B60T 13/146 |
| | | | 303/10 |
| 2014/0188774 A1* | 7/2014 | George | G05B 23/0254 |
| | | | 706/46 |

OTHER PUBLICATIONS

Seki et al., "Industrial application of a nonlinear model predictive control to polymerization reactors", Elsevier Science, 2001, 10pg.*
European Patent Office Search Report (2 pages) dated Aug. 6, 2013.

* cited by examiner

DELAY-MINIMIZED DETECTION OF AN AUXILIARY CONTROL VARIABLE

TECHNICAL FIELD

The present invention relates to a method for the delay-minimized detection of an auxiliary control variable for a system comprising a control system and a controller.

BACKGROUND ART

Regulated and non-regulated pump drives are known from the state of the art, whereby regulated pump drives are more efficient. For example, a regulated pump system can be configured with a variable speed and can essentially comprise a drive unit consisting of a frequency converter and control electronics, a standard electric motor or an electric servomotor as well as a hydraulic pump. In this context, the delivery rate of the hydraulic pump is proportional to the input speed of the electric motor. During operation, the machine control unit transmits the target values of the pressure/volumetric flow to a controller. The prevailing system pressure is detected by a pressure measuring means and is likewise transmitted to the controller. On the basis of the control deviation, the controller calculates the necessary motor speed and adjusts it to the delivery rate and pressure in accordance with the applicable system requirements.

Radial piston pumps, for example, lend themselves as the hydraulic pump. The requisite drive torque is transmitted by a shaft via a coupler to a cylinder star that is mounted on a control journal. Pistons arranged radially in the cylinder star are supported, for example, via sliding blocks, on a stroke ring. The piston and the sliding block are joined together, for instance, by means of a ball-and-socket joint. The sliding blocks pass through the stroke ring and, during operation, they are pressed against the stroke ring by centrifugal force and by oil pressure. When the cylinder star rotates, the pistons execute a stroke movement due to the eccentric position of the stroke ring. The eccentricity is changed by displacement pistons that are actuated by a pilot valve. Changing the eccentricity influences the magnitude of the stroke, whereby the delivered fluid volume results from the stroke and the speed.

In order to influence the behavior of the pressure control loop, the state variable pertaining to the pressure change or to the delivery rate is needed for the control loop. The delivery rate and the pressure change are of the same order in systems having hydraulic capacities. The delivery rate is directly proportional to a given speed in speed-controlled piston pumps, whereas it is directly proportional to the pivoting angle or to the position of the stroke ring in displacement pumps, and it is directly proportional to the position of the valve slide in the case of valve control units. The delivery rate can be measured directly without delay. The pressure change can be obtained through differentiation of the pressure signal. The use of the delivery rate in the feedback improves the dynamic behavior of the control loop but, in the case of disturbance situations of the control loop in which fluid is consumed, it gives rise to control errors. Providing an additional integrator in the control loop has proven its worth as a measure for minimizing such control errors. As an alternative, the signal can be applied via an extremely low-frequency high-pass filter, which leads to a decoupling of the common mode portion.

Both of these measures detrimentally affect the dynamics of the disturbance characteristic. This drawback does not exist if the pressure change instead of the delivery rate is employed as the feedback. A problem in this context, however, is the detection of the pressure change. The pressure is measured and the pressure change is ascertained by means of differentiation of the pressure. In pump applications, the pressure signal is very noisy. Differentiation without low-pass filtering is of only limited usefulness in the control loop. The low-pass filtering often has to be carried out in the fundamental frequency range of the control loop. Due to this delay in the detection of the pressure change, the power of this state variable to influence the control dynamics cannot be fully utilized.

BRIEF SUMMARY OF THE INVENTION

The present invention provides a method for the delay-minimized detection of an auxiliary control variable for a system comprising a control system and a controller, whereby an output variable is detected at the end of the control system, whereby a disturbance variable is active in the control system. The system can be a mechanical system or a hydraulic system. The mechanical system can comprise a component that generates a force. This force is employed to transmit signals and/or energy. For control purposes, the actual force is detected as the control variable. In hydraulic systems, the actual pressure is the control variable. In hydraulic systems, it is the case that signals, force and/or energy are transmitted by means of a fluid. For this purpose, a hydraulic pressure and/or a volumetric flow have to be available in the system. These variables are normally generated by pumps. In order to generate pressure and/or a volumetric flow, these pumps consume energy. However, the system boundary can also be defined more narrowly, so that the pump is outside of the observed system.

The method according to the invention carries out the delay-minimized detection of an auxiliary control variable for a system comprising a control system and a controller, whereby an output variable is detected at the end of the control system, whereby a disturbance variable is active in the control system, in that a state variable is detected in the control system at a place before the point of action of the disturbance variable, whereby the auxiliary control variable is calculated from the state variable that has been weighted with a constant $k_x$ and from an estimation error, whereby the estimation error is calculated from a comparison between the detected output variable and the integrated auxiliary control variable. The estimated pressure change comprises the estimation error and the stroke ring signal that has been weighted with a constant $k_x$. The feedback of the internal control loop is now determined by the non-delayed auxiliary signal, and no longer by the delayed differentiation. Moreover, this signal is not nearly as noisy. The detected output variable can be averaged by means of a filter for purposes of further processing. The auxiliary control variable can especially be fed back to the controller via a proportional element, and the estimation error can be weighted with a proportional factor before the comparison to the state variable that has been weighted with the constant $k_x$.

In one advantageous embodiment, the estimation error is weighted with a proportional factor before it is added to the state variable that has been weighted with the constant $k_x$.

In one embodiment, the system is a hydraulic system containing a hydraulic fluid, and the detected output variable is a mechanical variable, the latter being a force that is generated by a hydraulic cylinder to which a pressure (p) can be applied by means of a hydraulic fluid. Here, sensors located at the end of the control system can detect the actual force as the control variable.

In another embodiment, the system is a hydraulic system containing a hydraulic fluid, and the detected output variable is the pressure of the hydraulic fluid. Here, sensors located at the end of the control system can detect the actual force as the control variable.

In one advantageous refinement, the hydraulic system comprises a component by means of which a volumetric flow of the hydraulic fluid can be generated that leads to a pressure change in the hydraulic system.

In this context, the component by means of which a volumetric flow can be generated can be a valve, whereby the hydraulic system can be connected to a constant-pressure network via the valve and whereby the valve controls the volumetric flow between the constant-pressure network and the hydraulic system.

As an alternative, the component by means of which a volumetric flow can be generated can be a constant pump driven by a motor, whereby the volumetric flow is adjusted by varying the motor speed.

Alternatively, the component by means of which a volumetric flow can be generated can be a displacement pump driven by a motor, whereby the volumetric flow is adjusted by changing the delivery volume per rotation and/or by varying the motor speed. Here, the displacement pump can be a radial piston pump having a stroke ring, whereby the delivery volume of the pump results from the position of the stroke ring and from the motor speed. Here, the hydraulic system can have an internal control loop for the pressure change and an external control loop for the pressure. The displacement pump can be, for instance, a radial piston pump or an axial piston pump, whereby, in case of a radial piston pump, the volumetric flow of the pump results from the position of the stroke ring and from the motor speed. In the case of an axial piston pump, the volumetric flow of the pump results from the pivoting angle and from the motor speed.

In one advantageous refinement, the constant $k_x$ is inversely proportional to the capacity c of the hydraulic system and proportional to the motor speed n and to the pump delivery rate.

In one advantageous embodiment, the auxiliary control variable is the estimated pressure change.

In the inventive system comprising a control system, a sensor system for detecting an output variable at the end of the control system, and a controller for controlling the output variable, whereby the control system can be acted upon by a disturbance variable at a point of action, a state variable can be detected in the control loop at a place before the point of action of the disturbance variable, whereby an auxiliary control variable can be calculated from the state variable that has been weighted with a constant $k_x$ and from an estimation error, whereby the estimation error is calculated from a difference between the detected output variable and the integrated auxiliary control variable.

In one advantageous embodiment, the detected output variable can be averaged by means of a filter for purposes of the detection.

In one embodiment, the system is a hydraulic system containing a hydraulic fluid. The detected output variable here is a mechanical variable, the latter being a force that is generated by a hydraulic cylinder to which a pressure (p) can be applied by means of a hydraulic fluid.

As an alternative, the system can also be a hydraulic system containing a hydraulic fluid, whereby the detectable output variable is the pressure of the hydraulic fluid.

In this context, the hydraulic system can comprise a component by means of which a volumetric flow of the hydraulic fluid can be generated that leads to a pressure change in the hydraulic system.

In one advantageous embodiment, the component by means of which a volumetric flow can be generated is a valve, whereby the hydraulic system can be connected to a constant-pressure network via the valve, and whereby the valve can control the volumetric flow between the constant-pressure network and the hydraulic system.

In one alternative embodiment, the component by means of which a volumetric flow (Q) can be generated is a constant pump driven by a motor, whereby the volumetric flow is adjusted by varying the motor speed.

In another alternative embodiment, the component by means of which a volumetric flow can be generated is a displacement pump driven by a motor, whereby the volumetric flow is adjusted by varying the delivery volume per rotation and/or by varying the motor speed.

In one advantageous embodiment, an electronic circuit with which the method according to the invention can be carried out is arranged on the component that generates the volumetric flow. Here, the electronic circuit can be situated on the component that generates the volumetric flow. If a displacement pump is being used, the control electronics and the pump can form a unit. In the case of speed-controlled pumps, the algorithm can be located in the converter. If a constant-pressure network is being used, whereby the volumetric flow from the constant-pressure network is controlled by a valve, then the control electronics and the valve can form a unit. By means of these so-called on-board electronics, the controller can be configured so as to be very compact and the control delay is further minimized. Moreover, there is no need for wiring between the electronics and the other components such as the controller, the sensor system, the pump and/or the valve.

Other advantages, special features and practical refinements of the invention ensue from the subordinate claims and from the description below of preferred embodiments making reference to the figures.

DETAILED DESCRIPTION OF THE PREFERRED EMBODIMENTS

Figure 1:
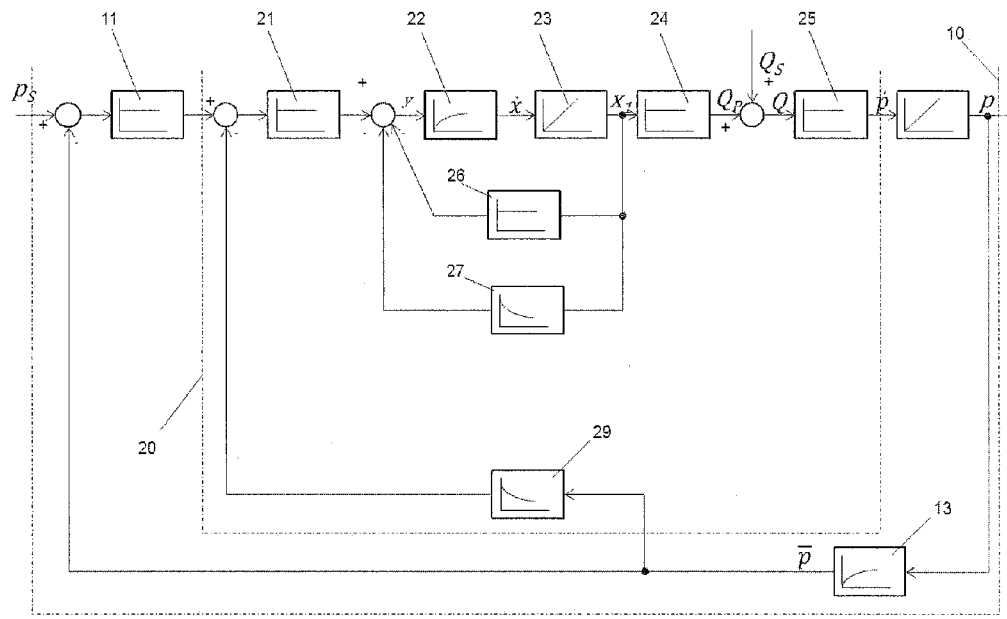
FIG. 1 a signal flow diagram for a conventional control loop having a controller output that is proportional to a volumetric flow change, as known from the state of the art.

FIG. 1 shows an example of a signal flow diagram for a conventional control loop, as known from the state of the art. The controller output y is proportional to a change in the volumetric flow such as is the case, for example, with the regulation of a control loop with a displacement pump. The control loop consists of an external control loop 10 for the pressure p and of an internal control loop 20 for the pressure change $\dot{p}$.

This is an idealized control loop. In a real control system, the pressure build-up will not take place in an individual capacitor, but rather in any desired conductor network consisting of capacitors, inductors and hydraulic resistors.

The target pressure signal $p_s$ is applied as the actuating variable y to a pilot valve 22 via a proportional element 11 and via a proportional element 21. The pilot valve 22 actuates the displacement pistons that displace the stroke ring. A signal for the stroke ring position $x_1$ is derived from the stroke ring position change $\dot{x}$ by means of an integrator 23. The pump volumetric flow $Q_P$ is obtained by means of a proportional element 24 that has been weighted with the speed of the pump and with the delivery volume of the pump. For instance, a leak as a disturbance volumetric flow $Q_S$ yields an actual volumetric flow Q. The capacitor of the system, shown in the form of a proportional element 25, yields a pressure change $\dot{p}$ from which the pressure p is derived through integration. This pressure p can be measured directly with a sensor, for instance, a pressure transducer, and it can then be fed back via a filter 13 to the target pressure $p_s$ as an averaged pressure $\bar{p}$. In order to improve the control precision, the averaged pressure $\bar{p}$ can likewise be additionally fed back via a differentiator 29. In order to obtain a smooth actuating signal y at the pilot valve 22, and thus to minimize unnecessary wear-prone actuating movements, the signals have to be filtered. In particular, the pressure change signal $\dot{p}$ has to be filtered near the fundamental frequency range of the control loop, as a result of which the dynamics of the control loop decrease. A remedy for this situation is the feedback of the stroke ring signal $x_1$ via a proportional element 26 and via a differentiating element 27. However, the feedback of the stroke ring signal $x_1$ via a proportional element entails the drawback that a control deviation remains if a disturbance variable is present. Feedback before the summation place of the disturbance variable, however, gives rise to control deviations. The feedback via a differentiating element such as a high-pass filter detrimentally affects the dynamic disturbance characteristic since the time constant of the high-pass filter has to be selected so as to be large.

Figure 2:
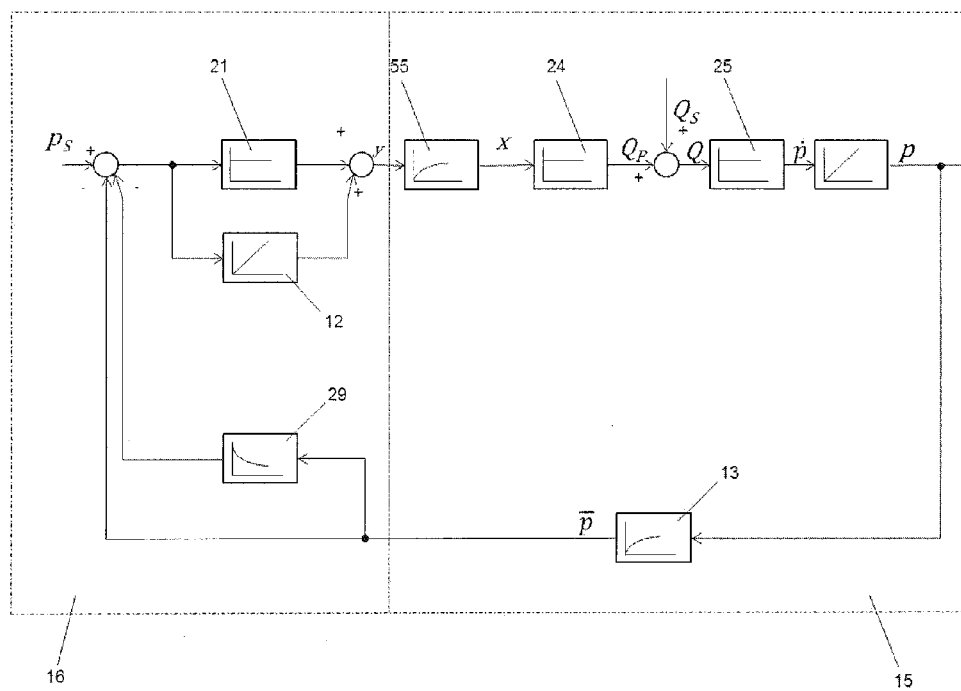
FIG. 2 a signal flow diagram for a conventional control loop having a controller output that is proportional to a volumetric flow, as known from the state of the art.

FIG. 2 shows a signal flow diagram for a conventional control loop having a controller output y that is proportional to a volumetric flow, as known from the state of the art.

The controller output y controls a volumetric flow proportionally, as is the case, for instance, with the regulation of a control loop with variable-speed pump drives or valve control units.

The control loop consists of a control loop 15 for the pressure p and of the controller 16. This is likewise an idealized control loop. In a real control system, the pressure build-up will not take place in an individual capacitor, but rather in any desired conductor network consisting of capacitors, inductors and hydraulic resistors.

The target pressure signal $p_s$ is applied as the actuating variable y to a control system 55, 24 via an integral element 12 and via a proportional element 21, thus yielding the pump volumetric flow $Q_P$. For instance, a leak as a disturbance volumetric flow $Q_S$ yields an actual volumetric flow Q. The capacitor of the system, shown in the form of a proportional element 25, yields a pressure change $\dot{p}$ from which the pressure p is derived through integration. This pressure p can be measured directly with a sensor, for instance, a pressure transducer, and it can then be fed back via a filter 13 to the target pressure $p_s$ as an averaged pressure $\bar{p}$. In order to improve the control precision and the dynamics, the averaged pressure $\bar{p}$ can likewise be additionally fed back via a differentiator 29.

Figure 3:
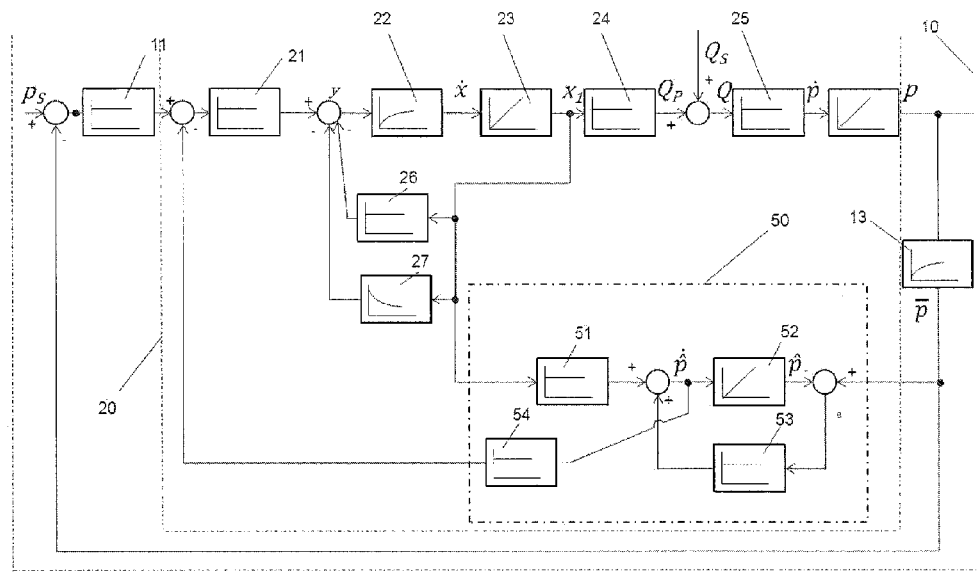
FIG. 3 a signal flow diagram in accordance with the method according to the invention, for the same situation as in FIG. 1.

FIG. 3 shows a signal flow diagram in accordance with the method according to the invention, for the same situation as in FIG. 1. The target pressure signal $p_s$ is fed as the actuating variable y to the pilot valve 22 via a proportional element 11 and via a proportional element 21. The pilot valve 22 actuates the displacement pistons that displace the stroke ring. A signal for the stroke ring position $x_1$ is derived from the stroke ring position change $\dot{x}$ by means of an integrator 23. Like in the situation depicted in FIG. 1, the stroke ring signal $x_1$ is fed back via a proportional element 26 and via a differentiating element 27 as a high-pass filter. In the control system, a signal for the stroke ring position $x_1$ is derived from the stroke ring position change $\dot{x}$ via an integrator 23. The pump volumetric flow $Q_P$ results from the stroke ring position $x_1$ that has been weighted with the speed of the pump via a proportional element 24. For instance, a leak can cause a disturbance volumetric flow $Q_S$. Taking this disturbance volumetric flow $Q_S$ into consideration, the actual volumetric flow Q is obtained from the pump volumetric flow $Q_P$. The capacitor of the system, shown in the form of a proportional element 25, yields a pressure change $\dot{p}$ from which the pressure p is derived through integration. This pressure p can be measured directly with a sensor, for instance, a pressure transducer. The pressure signal p can be made available to an observer 50 via a filter 13 as an averaged pressure $\bar{p}$. The input variable for the observer 50 is the stroke ring signal $x_1$, which is tapped without a delay. The stroke ring signal $x_1$ is weighted with a constant $k_x$ in a proportional element 51. The constant $k_x$ is inversely proportional to the capacity c of the hydraulic system and proportional to the motor speed n and to the delivery rate of the pump. The estimation error e that has been weighted with a proportional factor in the proportional element 53 is added to the stroke ring signal $x_1$ that has been weighted with the constant $k_x$ in order to obtain the estimated pressure change $\dot{\hat{p}}$. The estimated pressure change $\dot{\hat{p}}$ becomes the estimated pressure $\hat{p}$ through the integration element 52. The estimation error e results from the difference between the measured pressure p and the estimated pressure $\hat{p}$.

The estimated pressure change $\dot{\hat{p}}$ is then fed to the signal of the target pressure via a proportional element 54 for comparison purposes. Consequently, the feedback of the internal control loop is now determined by the non-delayed stroke ring signal $x_1$ and no longer by the delayed differentiation. Moreover, this signal is considerably less noisy. The controller now operates more robustly, whereby the disturbance characteristic is not considerably influenced.

Figure 4:
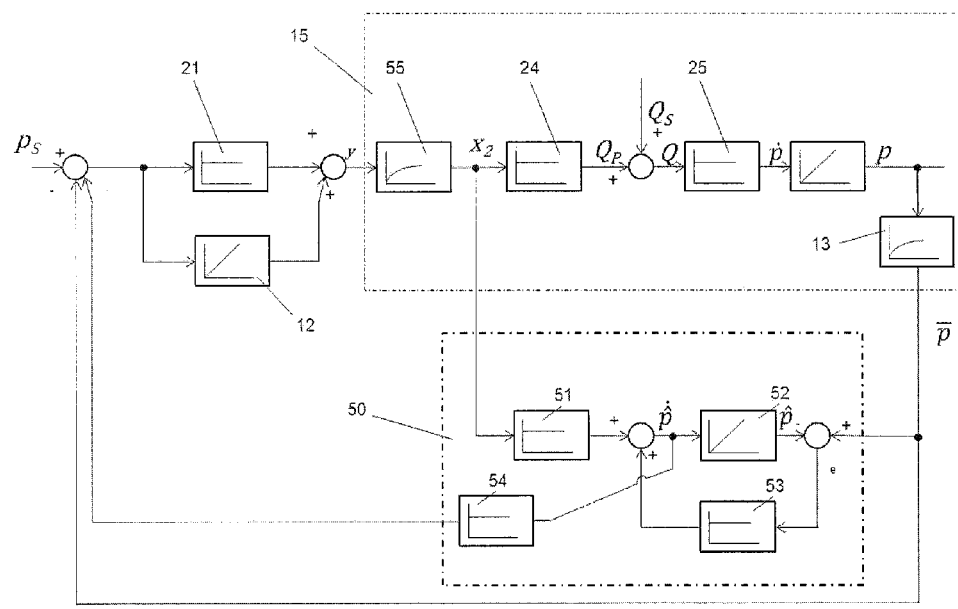
FIG. 4 a signal flow diagram in accordance with the method according to the invention, for the same situation as in FIG. 2.

FIG. 4 shows a signal flow diagram in accordance with the method according to the invention, for the same situation as in FIG. 2. The target pressure signal $p_s$ is sent as the actuating variable y to an actuating system 55; 24 via an integral element 12 and via a proportional element 21, thus yielding the pump volumetric flow $Q_P$. For instance, a leak as a disturbance volumetric flow $Q_S$ yields the actual volumetric flow Q. The capacitor of the system, shown in the form of a proportional element 25, yields a pressure change $\dot{p}$ from which the pressure p is derived through integration. This pressure p can be measured directly with a sensor, for instance, a pressure transducer, and it can then be fed back via a filter 13 to the target pressure $p_s$ as an averaged pressure $\bar{p}$. The pressure signal p is made available to an observer 50 via a filter 13 as an averaged pressure $\bar{p}$. The input variable for the observer 50 is the signal $x_2$ pertaining to the position of the pump when a displacement pump is used, to the position of the motor speed when a constant pump is used, or to the position of the valve in the case of a valve-controlled volumetric flow from a constant-pressure network, which is tapped without a delay. The signal $x_2$ is weighted with a constant $k_x$ in a proportional element 51. The constant $k_x$ is dependent on the transmission elements 24, 25. If the transmission elements 24, 25 in the control system change, it is advantageous to adapt the proportional element 51. The estimation error e that has been weighted with a proportional factor in the proportional element 53 is added to the stroke ring signal $x_2$ that has been weighted with the constant $k_x$ in order to obtain the estimated pressure change $\dot{\hat{p}}$. The estimated pressure change $\dot{\hat{p}}$ becomes the pressure change $\hat{p}$ through the integration element 52. The estimation error e results from the difference between the measured pressure p and the estimated pressure $\hat{p}$.

The estimated pressure change $\dot{\hat{p}}$ is then fed to the signal of the target pressure via a proportional element 54 for comparison purposes. Consequently, the feedback of the internal control loop is now determined by the non-delayed stroke ring signal $x_2$ and no longer by the delayed differentiation. Moreover, this signal is considerably less noisy. The controller now operates more robustly, whereby the disturbance characteristic is not considerably influenced.

An objective of the embodiments is to put forward a method for the delay-minimized detection of an auxiliary control variable for a system comprising a control system and a controller, whereby an output variable is detected at the end of the control system, whereby a disturbance variable is active in the control system.

Another objective is to put forward a hydraulic system in which the pressure is regulated via a non-delayed pressure-change signal.

The embodiments shown here merely constitute examples of the present invention and therefore must not be construed to be of a limiting nature. Alternative embodiments considered by the person skilled in the art are likewise encompassed by the protective scope of the present invention.

LIST OF REFERENCE NUMERALS

10 external control loop
11 proportional element
12 integral element
13 sensor filter
15 control system
16 controller
20 internal control loop
21 proportional element
22 pilot valve
23 integrator for the stroke ring signal
24 proportional element for the stroke ring speed
25 proportional element for the capacitor
26 proportional element for the feedback
27 differentiator for the feedback
29 differentiator for the feedback of the averaged pressure
50 observer
51 proportional element $k_x$
52 integration element for the estimated pressure signal
53 proportional element
54 proportional element for the stabilization
55 actuating system
c capacity
e estimation error
n motor speed
p pressure
$p_s$ target pressure
$\dot{p}$ pressure change
$\bar{p}$ averaged pressure
$\hat{p}$ estimated pressure
$\dot{\hat{p}}$ change in the estimated pressure
Q volumetric flow
$Q_P$ volumetric flow of the pump
$Q_S$ disturbance volumetric flow
$X_1$ stroke ring position, stroke ring signal
$\dot{x}$ change in the stroke ring position
$X_2$ signal pertaining to the pump, speed or valve
y actuating variable

What is claimed is:

1. A method for the delay-minimized detection of an auxiliary control variable for a system comprising a control system and a controller, whereby an output variable is detected at the end of the control system, whereby a disturbance variable is active in the control system, wherein the system is a hydraulic system containing a hydraulic fluid and having a capacity (c), and the detected output variable is either the pressure (p) of the hydraulic fluid or is a mechanical variable, the latter being a force that is generated by a hydraulic cylinder to which a pressure (p) can be applied by means of a hydraulic fluid, comprising the steps of:
   detecting a state variable in the control system at a place before a point of action of the disturbance variable;
   whereby the auxiliary control variable is calculated from the state variable that has been weighted with a constant $k_x$ and from an estimation error (e) wherein the constant $k_x$ is inversely proportional to the capacity (c) of the hydraulic system; and
   whereby the estimation error (e) is calculated from a comparison between the detected output variable and the integrated auxiliary control variable.

2. The method according to claim 1, wherein the estimation error (e) is weighted with a proportional factor before it is added to the state variable that has been weighted with the constant $k_x$.

3. The method according to claim 1, wherein the system is a hydraulic system containing a hydraulic fluid, and the detected output variable is a mechanical variable, the latter being a force that is generated by a hydraulic cylinder to which a pressure (p) can be applied by means of a hydraulic fluid.

4. The method according to claim 2, wherein the system is a hydraulic system containing a hydraulic fluid, and the detected output variable is a mechanical variable, the latter being a force that is generated by a hydraulic cylinder to which a pressure (p) can be applied by means of a hydraulic fluid.

5. The method according to claim 1, wherein the system is a hydraulic system containing a hydraulic fluid, and the detected output variable is the pressure (p) of the hydraulic fluid.

6. The method according to claim 2, wherein the system is a hydraulic system containing a hydraulic fluid, and the detected output variable is the pressure (p) of the hydraulic fluid.

7. The method according to claim 3, wherein the hydraulic system comprises a component by means of which a volumetric flow (Q) of the hydraulic fluid can be generated that leads to a pressure change ($\dot{p}$) in the hydraulic system.

8. The method according to claim 5, wherein the hydraulic system comprises a component by means of which a volumetric flow (Q) of the hydraulic fluid can be generated that leads to a pressure change ($\dot{p}$) in the hydraulic system.

9. The method according to claim 7, wherein the component by means of which a volumetric flow (Q) can be generated is a valve, whereby the hydraulic system can be connected to a constant-pressure network via the valve and whereby the valve controls the volumetric flow (Q) between the constant-pressure network and the hydraulic system.

10. The method according to claim 7, wherein the component by means of which a volumetric flow (Q) can be generated is a constant pump driven by a motor, whereby the volumetric flow (Q) is adjusted by varying the motor speed (n).

11. The method according to claim 7, wherein the component by means of which a volumetric flow (Q) can be generated is a displacement pump driven by a motor, whereby the volumetric flow (Q) is adjusted by varying the delivery volume per rotation and/or by varying the motor speed (n).

12. The method according to claim 10, wherein the constant $k_x$ is inversely proportional to the capacity (c) of the hydraulic system and proportional to the motor speed (n) and to the pump delivery rate.

13. The method according to claim 11, wherein the constant $k_x$ is inversely proportional to the capacity (c) of the hydraulic system and proportional to the motor speed (n) and to the pump delivery rate.

14. The method according to claim 1, wherein the auxiliary control variable is an estimated pressure change ($\dot{p}$) in the hydraulic system.

15. A hydraulic system comprising:
a control system;
a sensor system for detecting an output variable at the end of the control system; and
a controller for controlling the output variable;
wherein the control system can be acted upon by a disturbance variable at a point of action;
wherein the hydraulic system contains a hydraulic fluid and has a capacity (c), and the output variable at the end of the control system is either the pressure (p) of the hydraulic fluid or is a mechanical variable, the latter being a force that is generated by a hydraulic cylinder to which a pressure (p) can be applied by means of a hydraulic fluid,
wherein a state variable can be detected in the control loop at a place before the point of action of the disturbance variable;
wherein an auxiliary control variable can be calculated from the state variable that has been weighted with a constant $k_x$ and from an estimation error (e) wherein the constant $k_x$ is inversely proportional to the capacity (c) of the hydraulic system; and
wherein the estimation error (e) is calculated from a comparison between the detected output variable and the integrated auxiliary control variable.

16. The system according to claim 15, wherein the detected output variable can be averaged by means of a filter for purposes of the detection.

17. The system according to claim 15, wherein the system is a hydraulic system containing a hydraulic fluid, and the detected output variable is a mechanical variable, the latter being a force that is generated by a hydraulic cylinder to which a pressure (p) can be applied by means of a hydraulic fluid.

18. The system according to claim 16, wherein the system is a hydraulic system containing a hydraulic fluid, and the detected output variable is a mechanical variable, the latter being a force that is generated by a hydraulic cylinder to which a pressure (p) can be applied by means of a hydraulic fluid.

19. The system according to claim 15, wherein the system is a hydraulic system containing a hydraulic fluid, and the detectable output variable is the pressure (p) of the hydraulic fluid.

20. The system according to claim 16, wherein the system is a hydraulic system containing a hydraulic fluid, and the detectable output variable is the pressure (p) of the hydraulic fluid.

21. The system according to claim 17, wherein the hydraulic system comprises a component by means of which a volumetric flow (Q) of the hydraulic fluid can be generated that leads to a pressure change ($\dot{p}$) in the hydraulic system.

22. The system according to claim 21, wherein the component by means of which a volumetric flow (Q) can be generated is a valve, whereby the hydraulic system can be connected to a constant-pressure network via the valve, and whereby the valve can control the volumetric flow (Q) between the constant-pressure network and the hydraulic system.

23. The system according to claim 21, wherein the component by means of which a volumetric flow (Q) can be generated is a constant pump driven by a motor, whereby the volumetric flow ($Q_p$) is adjusted by varying the motor speed (n).

24. The system according to claim 21, wherein the component by means of which a volumetric flow (Q) can be generated is a displacement pump driven by a motor, whereby the volumetric flow ($Q_p$) is adjusted by changing the delivery volume per rotation and/or by varying the motor speed (n).

25. The system according to claim 21, wherein an electronic circuit is arranged on the component that generates the volumetric flow (Q), whereby said circuit can be used to carry out a method according to claim 1.

* * * * *